(12) United States Patent
Tajima et al.

(10) Patent No.: US 6,512,533 B2
(45) Date of Patent: *Jan. 28, 2003

(54) IMAGE FORMING APPARATUS

(75) Inventors: Naoki Tajima, Tokyo (JP); Takeshi Suzuki, Tokyo (JP); Kazuyuki Tanoue, Tokyo (JP)

(73) Assignee: Konica Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/406,244

(22) Filed: Sep. 24, 1999

(65) Prior Publication Data
US 2001/0012049 A1 Aug. 9, 2001

(30) Foreign Application Priority Data
Oct. 2, 1998 (JP) ............................................ 10-281466

(51) Int. Cl.[7] ................................................ B41J 27/00
(52) U.S. Cl. ....................................... 347/242; 347/257
(58) Field of Search ................................ 347/242, 245, 347/49, 263, 257, 256, 241, 259; 359/822, 819

(56) References Cited

U.S. PATENT DOCUMENTS

| | | | | |
|---|---|---|---|---|
| 4,427,284 A | * | 1/1984 | Dannatt | 355/1 |
| 4,586,782 A | * | 5/1986 | Sakuma et al. | 359/212 |
| 4,800,401 A | * | 1/1989 | Sato et al. | 347/242 |
| 4,908,287 A | * | 3/1990 | Fukuchi et al. | 430/58.05 |
| 4,928,139 A | * | 5/1990 | Barton et al. | 355/1 |
| 5,739,830 A | * | 4/1998 | John et al. | 347/49 |
| 5,787,324 A | * | 7/1998 | Iwasaki | 347/245 X |
| 5,953,164 A | * | 9/1999 | Arnone et al. | 359/822 X |

FOREIGN PATENT DOCUMENTS

| | | | | |
|---|---|---|---|---|
| JP | 3-168715 | * | 11/1989 | G02B/26/10 |

* cited by examiner

*Primary Examiner*—Hai Pham
(74) *Attorney, Agent, or Firm*—Frishauf, Holtz, Goodman & Chick, P.C.

(57) ABSTRACT

A scanning optical system is provided with a plurality of scanning optical devices each including a light source to emit a light beam, a collimator lens into which the light beam emitted from the light source enters, a deflector to deflect the light beam passing through the collimator lens in a main scanning direction, an image forming lens to focus the light beam coming from the deflector onto a scanned surface, and a base plate on which the light source, the collimator lens, the deflector and the image forming lens are fixed. The plurality of scanning optical devices are piled up in a sub-scanning direction perpendicular to the main scanning direction in such a manner that each base plate is substantially parallel to other base plates, and the scanning optical system is further provided with a plurality of link members to connect two neighboring base plates independently of other base plates.

14 Claims, 10 Drawing Sheets

IMAGE FORMING APPARATUS

BACKGROUND OF THE INVENTION

This invention relates to an scanning optical device comprising at least a light source, a collimator lens into which a light beam emitted from said light source enters, a deflector which deflects the light beam having passed said collimator lens to the direction of main scanning, and an image forming lens which focuses the light beam having passed said deflector on the surface to be scanned and to an image forming apparatus having a plurality of the above-mentioned scanning optical devices arranged in the direction of sub-scanning.

Generally speaking, in an image forming apparatus capable of forming a multi-color image, a cylinder-shaped, or belt-shaped image bearing member is used. In forming a multi-color image by using this image bearing member, charging, exposure, and development are carried out for each of colors with the image bearing member rotated (moved), and the multiple color toner images are superposed one after another on the image bearing member and transferred onto a sheet of transfer paper by a one-time transfer operation.

Incidentally, in order to accomplish a high-speed printing, it is not required to have a structure such that exposure processing (writing by light) for one color is carried out in every rotation of the image bearing member. Instead a structure can be used such that the exposures for all of four colors Y, M, C, and K are carried out in every rotation of the image bearing member. In this case, not only a plurality of the developing units but also a plurality of the scanning optical devices corresponding to the respective colors should be provided in order that the multiple exposures and developments should be done at different positions on the image bearing member.

For example, in the case where a color image is formed using the four colors Y (yellow), M (magenta), C (cyan), and K (black), the scanning optical devices and the developing units for the respective colors Y, M, C, and K are arranged in the direction of sub-scanning, and each of the scanning optical devices is let to form the latent electrostatic image of the color corresponding to it in such a manner as to form the toner images precisely superposed on one another, and the latent electrostatic images are developed.

In this case, with respect one pixel of the latent images formed by the respective scanning optical devices, if the position of this pixel is deviated for a certain color, synthesis of the color can not be done at this pixel portion, producing a color deviation and lowering resolution, and image quality is deteriorated. In order to prevent the occurrence of this color deviation and the lowering of resolution, it is required that not only the characteristics of the respective scanning optical devices are made to be the same so as to be able to write the same scan line, but also that the respective optical devices are fixed in a precise positional relationship so as to make the scan lines for the respective colors coincide with one another.

To consider the characteristics of an individual scanning optical device, it is desirable for obtaining a good image that the scan lines on the surface to be scanned are straight and, that at the same time, the arrangement of the pixels forming any one of the scan lines has a uniform interval between any adjacent pixels. However, actually, the positioning of optical parts etc can not be precisely performed. Therefore, there have been problems that scan lines on the surface to be scanned are curved and that the arrangement of the pixels forming a scan line has an uneven interval between pixels.

Further, in the case where a multi-color image is formed, there has been a problem that the characteristics of the respective scanning optical devices can not be made equal, and that the respective scanning optical devices cannot be fixed in a precise positional relationship, resulting in deterioration of image quality.

SUMMARY OF THE INVENTION

This invention has been made in order to solve the above-described problems, and it is an object of this invention concerning a scanning optical device to actualize a scanning optical device capable of adjusting the scanning beam easily.

Further, it is an object of this invention concerning an image forming apparatus to actualize an image forming apparatus capable of getting rid of the deterioration of image quality owing to the scanning optical device.

The above object can be attained by the following structures.

A scanning optical system, comprises:
  a plurality of scanning optical devices, each scanning optical device including
    a light source to emit a light beam,
    a collimator lens into which the light beam emitted from the light source enters,
    a deflector to deflect the light beam passing through the collimator lens in a main scanning direction,
    an image forming lens to focus the light beam coming from the deflector onto a scanned surface, and
    a base plate on which the light source, the collimator lens, the deflector and the image forming lens are fixed, wherein the plurality of scanning optical devices are piled up in a sub-scanning direction perpendicular to the main scanning direction in such a manner that each base plate is substantially parallel to other base plates; and
  a plurality of link members to connect two neighboring base plates independently of other base plates.

A scanning optical system, comprises:
  a plurality of scanning optical devices, each scanning optical device including
    a light source to emit a light beam,
    a collimator lens into which the light beam emitted from the light source enters,
    a deflector to deflect the light beam passing through the collimator lens in a main scanning direction,
    an image forming lens to focus the light beam coming from the deflector onto a scanned surface,
    a contact member to come in contact with a first side surface of the image forming lens at three contact points on both end portions and a middle portion of the first side surface in terms of the main scanning direction;
    a pressing member to come in pressure contact with a second side surface of the image forming lens so as to press the image forming lens toward the contact member and
    a base plate on which the light source, the collimator lens, the deflector, the image forming lens, the contact member and the pressing member are fixed, wherein the plurality of scanning optical devices are piled up in a sub-scanning direction perpendicular to the main scanning direction in such a manner that each base plate is substantially parallel to other base plates; and a plurality of link members to connect two neighboring base plates independently of other base plates.

A scanning optical device, comprises:

a light source to emit a light beam;

a collimator lens into which the light beam emitted from the light source enters;

a deflector to deflect the light beam passing through the collimator lens in a main scanning direction;

an image forming lens to focus the light beam coming from the deflector onto a scanned surface;

a contact member to come in contact with a first side surface of the image forming lens at three contact points on both end portions and a middle portion of the first side surface in terms of the main scanning direction; and a pressing member to come in pressure contact with a second side surface of the image forming lens so as to press the image forming lens toward the contact member.

Further, the above object can be attained by the following preferable structures.

A scanning optical device comprising at least a light source, a collimator lens into which a light beam emitted from said light source enters, a deflector which deflects the light beam having passed said collimator lens to the direction of main scanning, and an image forming lens which focuses the light beam having passed said deflector on the surface to be scanned, said scanning optical device further comprising contact members capable of being in contact with said image forming lens at three points, that is, the both end portions of said image forming lens in the direction of main scanning and an intermediate point between the both end points respectively at the time of adjusting the position of said image forming lens, and an urging means for urging said image forming lens toward said contact members.

In this invention, a mechanism for adjusting and determining the position of the image forming lens is provided. The image forming lens is positioned in the vicinity of the surface to be scanned, and is easy to have a bend owing to its long size. In spite of this, according to this invention for adjusting the position to fix this image forming lens, the scanning beam is corrected easily and with a good efficiency. In addition to it, because the image forming lens is in contact with the contact members at the three points, namely, the both end portions in the main scanning direction and an intermediate portion between the both end portions at the time of adjusting the position of the image forming lens, it is possible to let the image forming lens take any position by displacing the points of contact.

In this case, if the points of contact of the image forming lens at its both end portions in the main scanning direction with the contact members are made to be positioned on a straight line which is approximately parallel to the main scanning direction, and the point of contact at the intermediate portion is placed at a position deviated from a position on the above-mentioned straight line in the direction perpendicular to the surface to be scanned, the adjustment of position of the image forming lens can be performed by moving at least one of the contact members placed at the above-mentioned three points of contact in the direction of sub-scanning.

It is desirable that the image forming lens is fixed to the base in order to prevent the deviation of the position of the image forming lens, after the adjustment and determination of the position of the image forming lens. By carrying out this fixing at a position in the neighborhood of the point of contact at the intermediate portion of the image forming lens, the image forming lens is fixed only at the intermediate portion, which makes it possible for the image forming lens to expand and contract freely in accordance with the variation of temperature and humidity of the surrounding; thus the image forming lens is never bent unnaturally and it can be avoided the unfavorable influence that a complex bending etc are produced in the scan lines.

An image forming apparatus according to the present invention comprises a plurality of scanning optical devices arranged in the direction of sub-scanning, each of said scanning optical devices comprising at least a light source, a collimator lens into which a light beam emitted from said light source enters, a deflector which deflects the light beam having passed said collimator lens to the-direction of main scanning, and an image forming lens which focuses the light beam having passed said deflector on the surface to be scanned, wherein any pair of the neighboring scanning optical devices are linked to each other, and the linking between these scanning optical devices is made by fixing a link member to each of the scanning optical devices in a manner capable of taking off, the position of one of the neighboring scanning optical devices being determined in the state of being freely movable (hereinafter referred to as 'state of floating off') against the other, and after that, fixing said linking members of the neighboring scanning optical devices to one another.

According to this invention, the positions of a plurality of scanning optical devices arranged in the direction of sub-scanning are adjusted and determined in the state of floating off against the others, and the linking members are mutually linked after determining the positions. Owing to this, by once precisely adjusting and determining the positions of the respective scanning optical devices, the positional relationship among the scanning optical devices will never be varied after that, and the deterioration of image quality owing to the scanning optical device can be prevented.

Further, because the linking members are fixed to the respective scanning optical devices in a manner capable of being taken off, in the case where the determination of the positions is proved to be not satisfactory after the linking of the neighboring scanning optical devices, it is possible that these link members are taken off from the scanning optical devices, with the state of mutual linking of the link members let to remain as it is, and then a new link members are attached to the scanning optical devices, and the positions are determined again, and the new link members are fixed to one another. Owing to this, it has become possible to utilize again the scanning optical devices.

Another image forming apparatus according to the present invention comprises a plurality of scanning optical devices arranged in the direction of sub-scanning, each of said scanning optical devices comprising at least a light source, a collimator lens into which a light beam emitted from said light source enters, a deflector which deflects the light beam having passed said collimator lens to the direction of main scanning, and an image forming lens which focuses the light beam having passed said deflector on the surface to be scanned, wherein each of said scanning optical devices comprises contact members capable of being in contact with said image forming lens at three points, that is, the both end portions of said image forming lens in the direction of main scanning and an intermediate point between the both end points respectively at the time of adjusting the position of said image forming lens, and an urging means for urging said image forming lens toward said contact member, and further, any pair of the neighboring scanning optical device are linked to each other, and the linking between these scanning optical device is made by fixing a link member to each of the scanning optical devices in a manner capable of taking off, the position of one of the neighboring scanning optical devices being determined in the state of floating off against the other, and after that, fixing said linking members of the neighboring scanning optical devices to one another.

According to this invention, in each of the scanning optical devices, the scanning beam can be corrected easily and with a good efficiency. Further, because the linking members are mutually linked after determining the positions, the positional relationship among the scanning optical devices is never varied, and the deterioration of image quality owing to the scanning optical device can be prevented. Furthermore, reutilization of the scanning optical device has become possible.

If an adhesive of the UV-hardening type is used for the above-described fixing of the scanning optical devices to one another, the determination of the positions is carried out with the adhesive injected into every clearance between the linking members, and the fixing can be done by applying an ultraviolet ray immediately after the determining of the positions, which makes the linking operation easy.

DETAILED DESCRIPTION OF THE PREFERRED EMBODIMENT (The First Example of the Embodiment)

Figure 1:
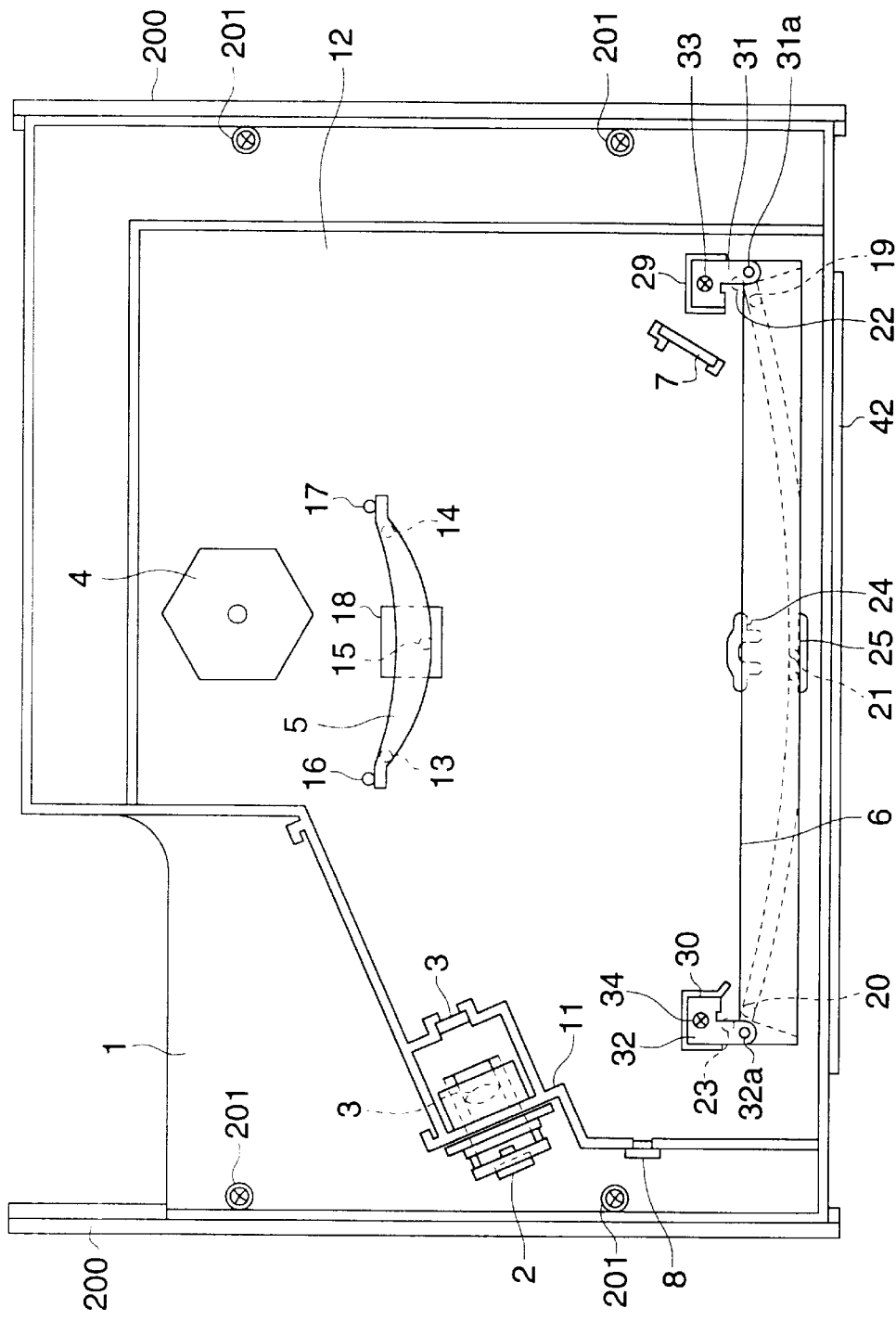
FIG. 1 is the plan showing an example of the embodiment of this invention concerning a scanning optical device.
Figure 2:
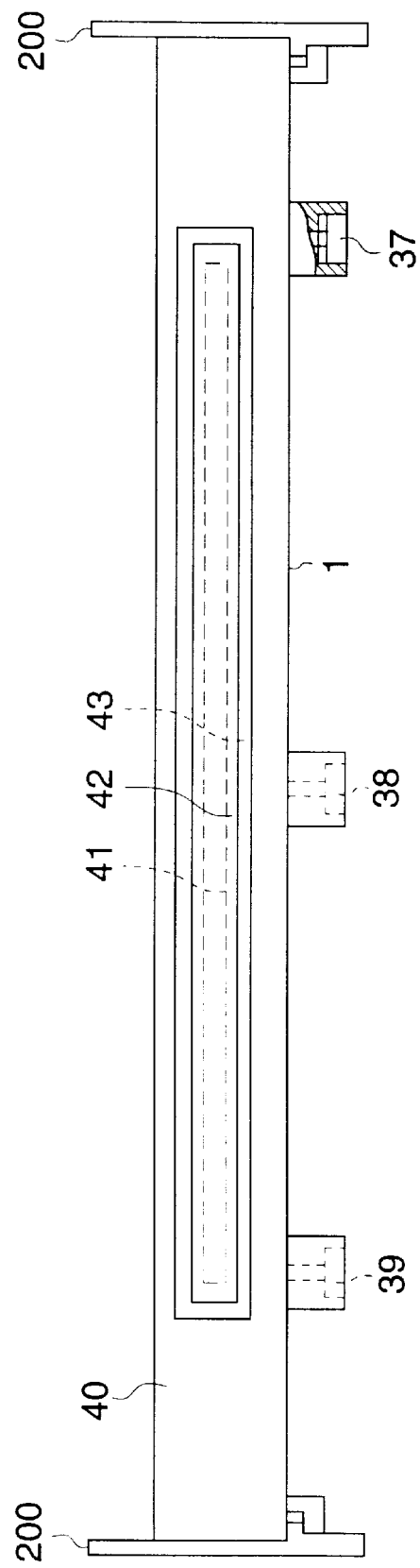
FIG. 2 is the front view showing the example of the embodiment of this invention concerning a scanning optical device.
Figure 3:
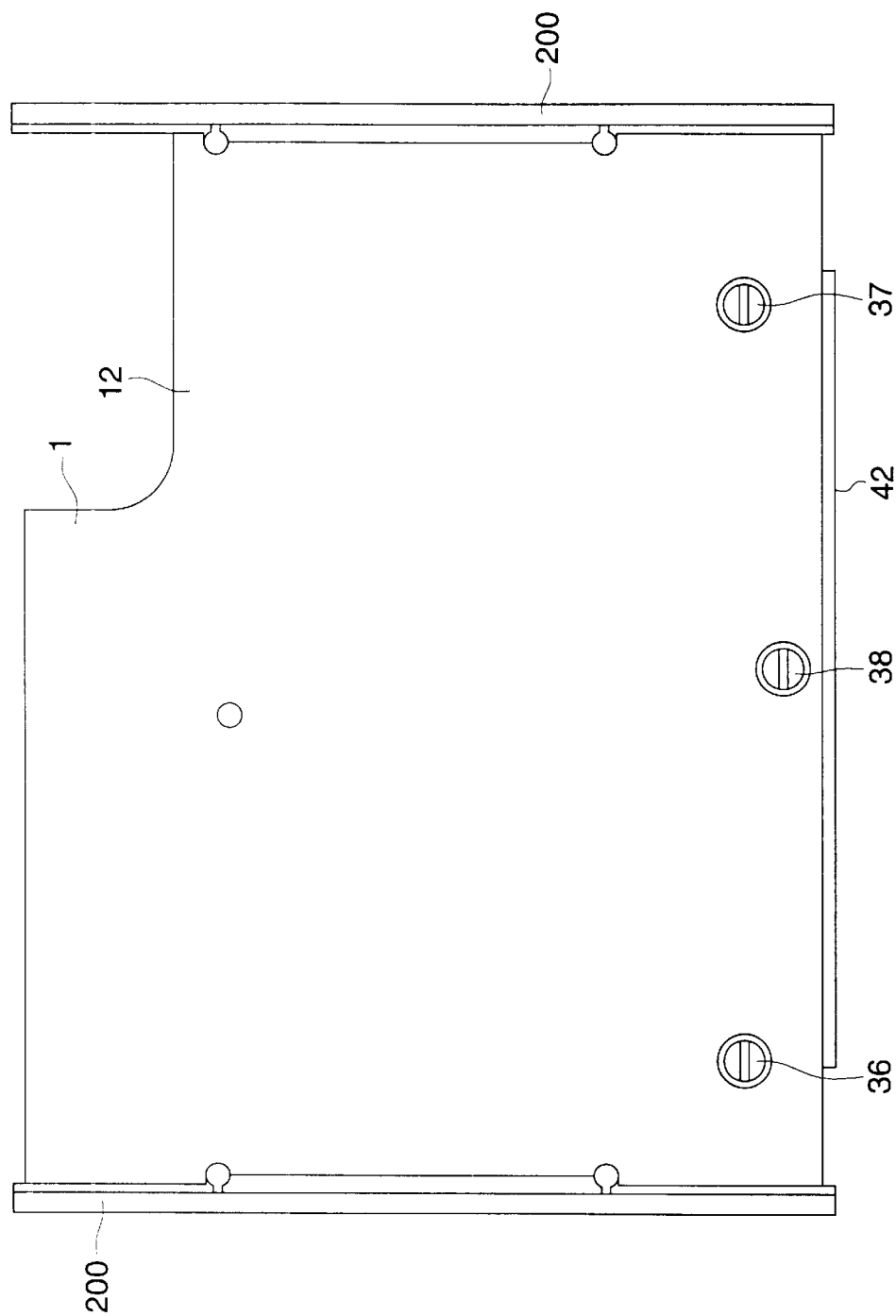
FIG. 3 is the bottom view showing the example of the embodiment of this invention concerning a scanning optical device.

FIG. 1 to FIG. 3 are drawings for illustrating an example of the embodiment of this invention concerning a scanning optical device; FIG. 1 is the plan, FIG. 2 is the front view, and FIG. 3 is the bottom view.

As shown in FIG. 1, the laser light source 2 emitting a laser beam in the horizontal direction, the collimator lens 3, and the first cylindrical lens 3' are attached to the standing wall portion 11, and on the bottom plate portion 12 of the base 1, there is provided the polygonal mirror 4 as a deflector for deflecting the laser beam having been emitted from the laser light source 2 and having passed the collimator lens 3 in the direction of main scanning in such a manner as to be capable of rotating around a vertical axis. Further, on the bottom plate portion 12 of the base 1, there are attached the fθ lens 5 into which the laser beam reflected by the polygonal mirror 4 enters, and the second cylindrical lens 6 as an image forming lens for focusing the laser beam having passed the fθ lens 5 on the surface to be scanned.

Figure 4:
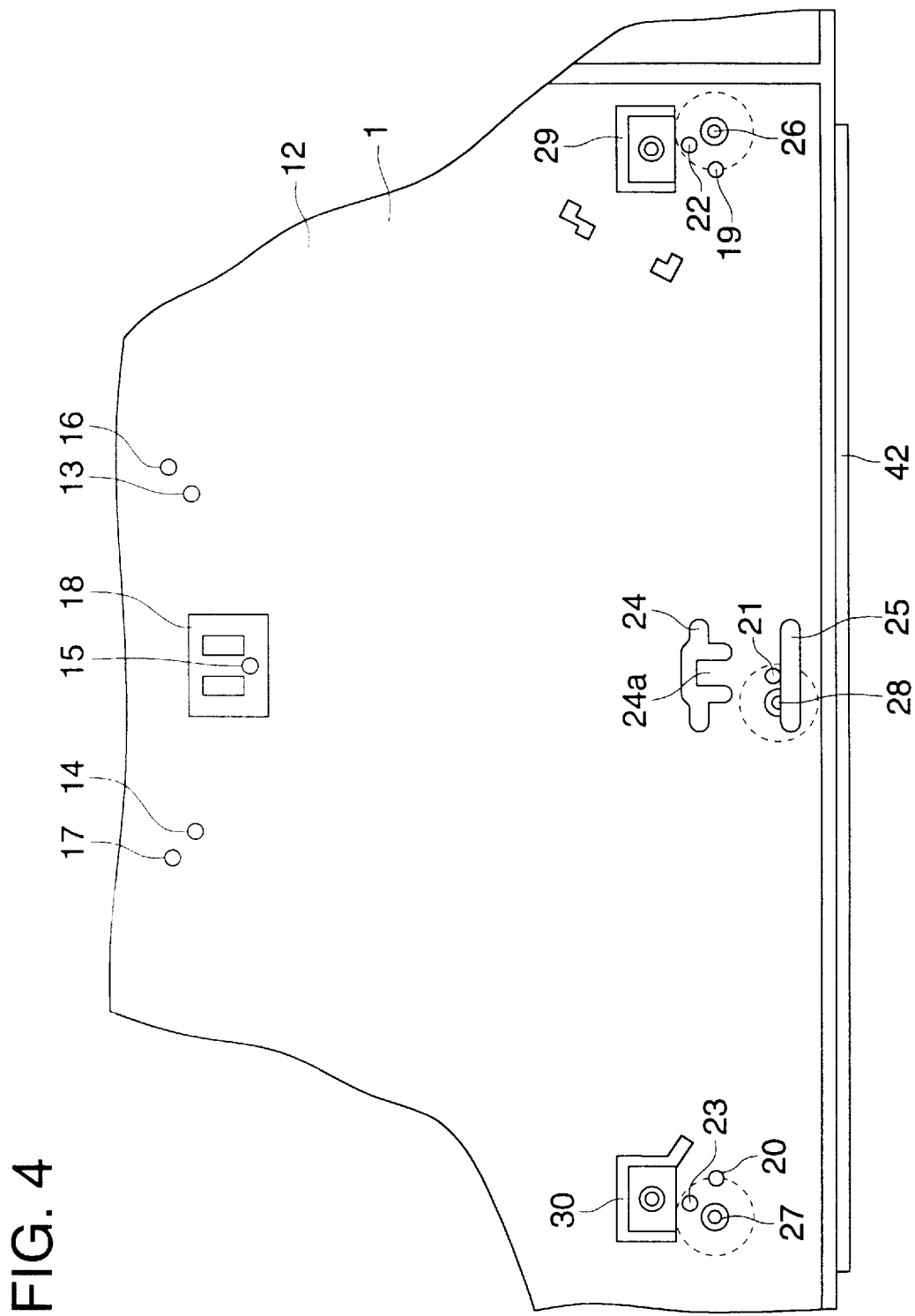
FIG. 4 is the enlarged plan showing a part of the base.

As shown in FIG. 4, at the mounting portion of the fθ lens 5 on the bottom plate portion 12 of the base 1, there are provided the projections 13 and 14 which are in contact with the lower surface of the both end portions of the fθ lens 5, the projection 15 which is in contact with the lower surface of the intermediate portion of the fθ lens 5, the projections 16 and 17 which are in contact with the side surface of the both end portions of the fθ lens 5, and the projection 18 for adhesive bonding which faces the lower surface of the intermediate portion of the fθ lens 5. The fθ lens 5 is bonded by an adhesive to the projection 18 for adhesive bonding after it is set in the state of contact with the above-mentioned projections 13 to 17.

Figure 5:
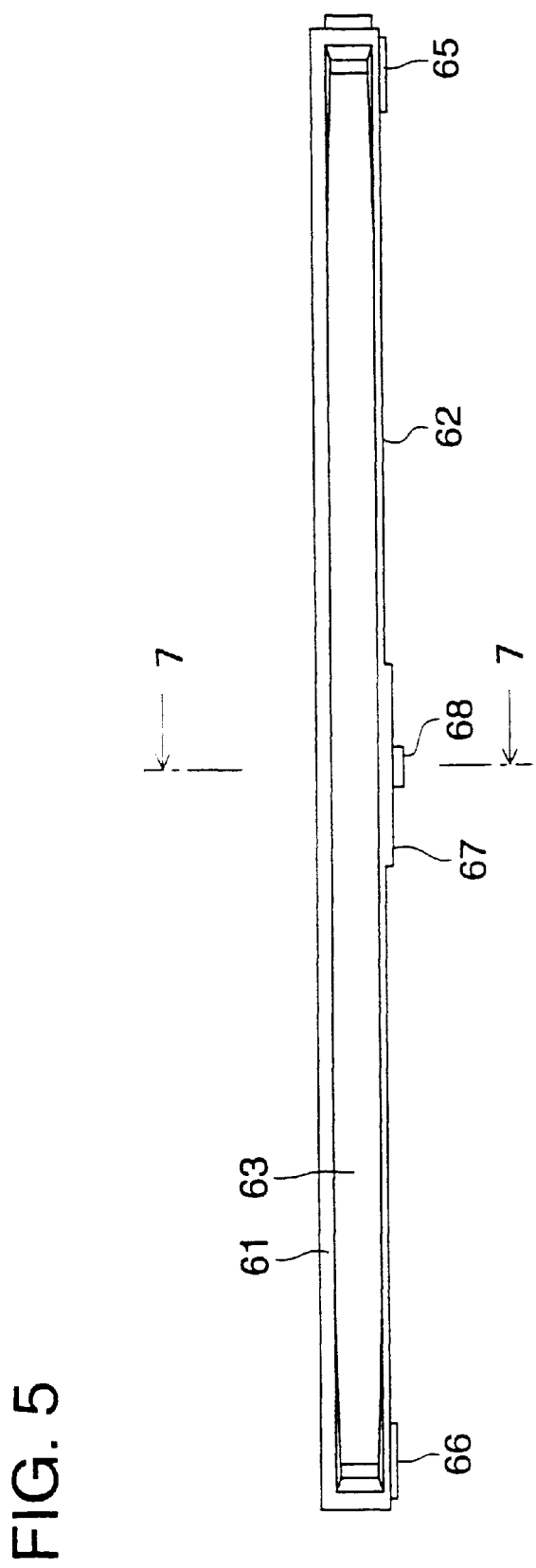
FIG. 5 is the front view of the second cylindrical lens.
Figure 6:
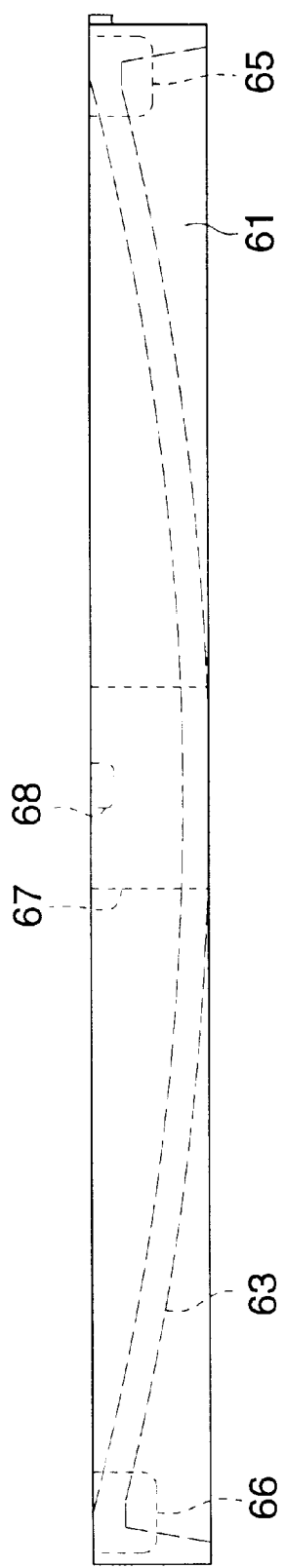
FIG. 6 is the plan of the second cylindrical lens.
Figure 7:
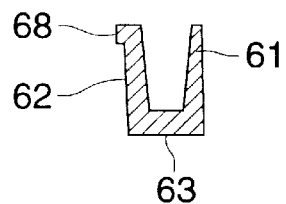
FIG. 7 is a cross-sectional view along the cutting line 7—7 in FIG. 5.

As shown in FIG. 5 to FIG. 7, the second cylindrical lens 6 has the rim portion 61 at its upper portion and the rim 62 at its lower portion, and the portion between them is the effective lens portion 63. At the lower surface of the both end portions of the rim portion 62, the supporting portions 65 and 66 are formed respectively, and also at the lower surface of the intermediate portion of the rim portion 62, the supporting portion 67 is formed. Further, the engaging projection 68 is formed on the supporting portion 67.

As shown in FIG. 1 and FIG. 4, at the mounting portion of the second cylindrical lens 6 on the bottom plate portion 12 of the base 1, there are provided the projections 19 and 20 which are capable of being in contact with the lower surface of the supporting portions 65 and 66 of the second cylindrical lens 6, the projections 22 and 23 which are capable of being in contact with the side surface of the both end portions of the second cylindrical lens 6, and the projections for adhesive bonding 24 and 25 which face the lower surface of the supporting portion 67 of the second cylindrical lens 6.

Further, at the positions in the neighborhood of the projections 19 to 21 facing the supporting portions 65 to 67 respectively, the screw holes 26 to 28 are bored. Further, in the neighborhood of the projections 22 and 23, the supporting rods 29 and 30 are fitted as projected.

For mounting the second cylindrical lens 6 to the bottom plate portion 12 of the base 1, first, the second cylindrical lens 6 is placed on the projections 19 to 21 with the supporting portions 65 to 67 positioned at the bottom. At this time, the side surfaces of the both end portions of the cylindrical lens 6 are supported by the projections 22 and 23, and the engaging projection 68 of the second cylindrical lens 6 is fitted into the slot 24a (refer to FIG. 4) of the projection for adhesive bonding 24 on the bottom plate portion 12. By this fit, the second cylindrical lens 6 is regulated with regard to the movement in the main scanning direction.

Figure 8:
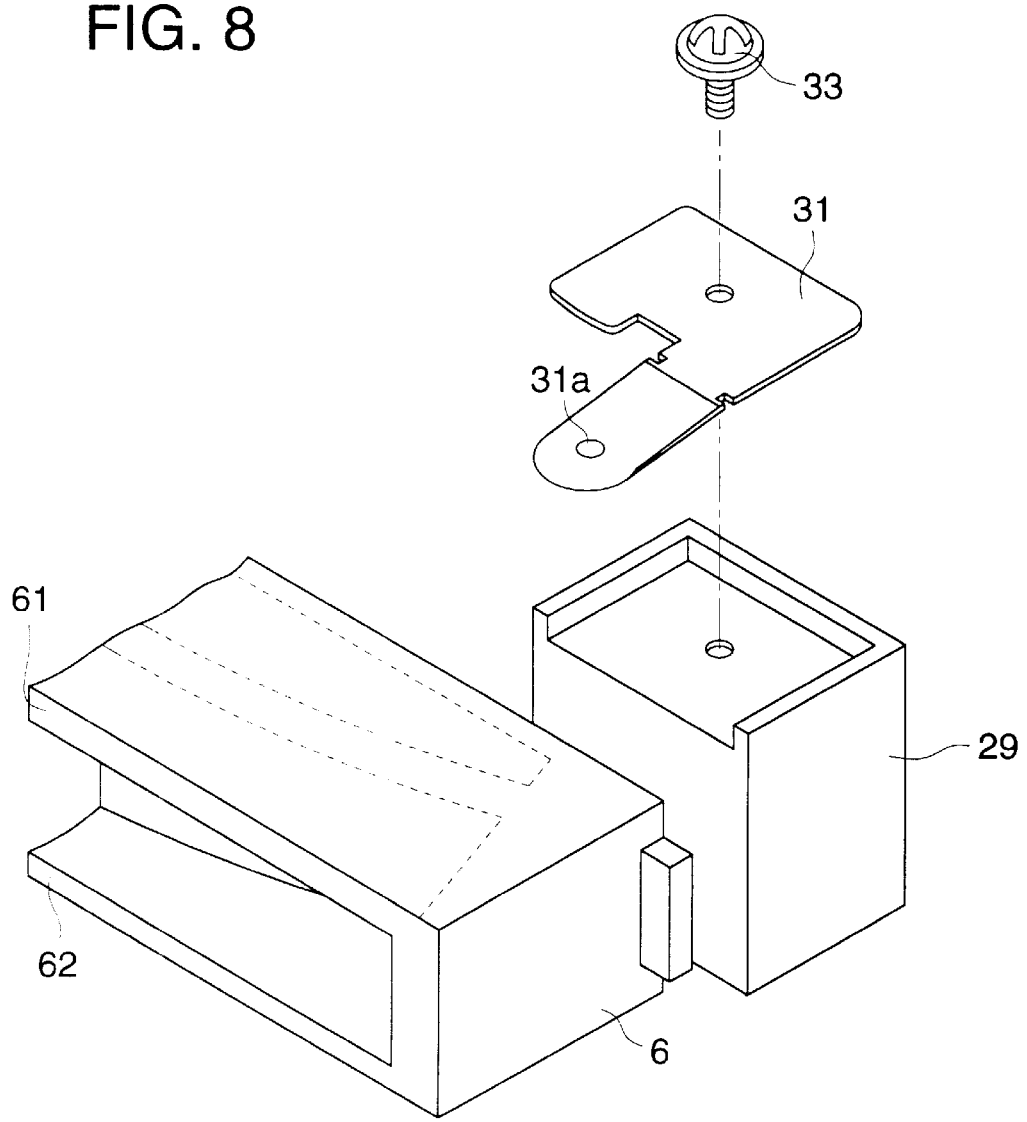
FIG. 8 is a perspective view showing the structure for urging the second cylindrical lens.

Next, as shown in FIG. 1 and FIG. 8, the base portions of the leaf springs 31 and 32 as urging means are fixed to the supporting rods 29 and 30 respectively by the screws 33 and 34, and the upper surfaces of the both end portions of the rim portion 61 of the cylindrical lens 6 are pressed downward by the free end portions of the leaf springs 31 and 32 (that is, the half-sphere-shaped projections 31a and 32a provided as projected downward in FIG. 8). This state of pressing is a temporary fixed state by an elastic force, and if a force is exerted to the second cylindrical lens 6, it can be removed.

In this example of the embodiment, for the purpose of performing the adjustment of the position of the second cylindrical lens 6, the screws for adjustment 36 to 38 as members for contact are forced to be inserted into the screw holes 26 to 28 from the bottom side. The front ends of these screws for adjustment 36 to 38 are capable of being in contact with the supporting portions 65 to 67 of the second cylindrical lens 6 at least at the time of adjusting the position of the second cylindrical lens 6, and if the front ends of the screws for adjustment 36 to 38 are projected upward farther than the projections 19 to 21, they become in contact with the supporting portions 65 to 67 of the second cylindrical lens 6. Because the second cylindrical lens 6 is always pressed by the half-sphere-shaped projections 31a and 32a of the leaf springs 31 and 32 toward the screws for adjustment 36 to 38, it is moved as engaged with the screws for adjustment 36 to 38.

In this example of the embodiment, the points of contact of the second cylindrical lens 6 against the screws for adjustment 36 and 37 at the end portions in the main scanning direction are positioned on a straight line which is approximately parallel to the main scanning direction, and the point of contact at the intermediate portion against the screw for adjustment 38 is deviated from a position on the above-mentioned straight line in the direction perpendicular to the surface to be scanned.

Accordingly, by rotating the screws for adjustment 36 to 38 separately to adjust the amount of projection, it is possible not only the parallel movement of the second cylindrical lens 6 in the upward and downward direction (the direction of sub-scanning), but also its tilting movement in the upward and downward direction (rotation around an axis parallel to the direction of main scanning) or its tilting movement in the left and right direction (rotation around an axis perpendicular to the surface to be scanned); thus, the second cylindrical lens 6 can take any desirable position. After this adjustment and determination of the position for the second cylindrical lens 6, the rim portion 62 is bonded to the projections for adhesive bonding 24 and 25 by using an adhesive of the UV-setting type or the like.

As shown in FIG. 2, in the front wall portion 40 of the base 1, which is positioned in front of the second cylindrical lens 6 and faces the surface to be scanned, it is bored the slit 41 for letting the laser beam having passed the second cylindrical lens 6 emerge, and the frame 42 is formed in such a manner as to surround this slit 41. Further, in this frame 42, the transparent cover 43 is bonded in such a manner as to close the slit 41.

In the neighborhood of one end portion of the second cylindrical lens 6, the mirror 7 is disposed in order that the laser beam having entered on it from the polygonal mirror 4 through the fθ lens 5 may be reflected toward the photo-sensor 8 which is attached to the standing wall portion 11. This photo-sensor 8 is provided for detecting that the laser beam reaches the predetermined beam position, and its output is used for the synchronization of main scanning.

The scanning by the laser beam in this example of the embodiment is quite the same as in the apparatus of the prior art. That is, the laser beam having been emitted from the laser light source 2 to the horizontal direction is made to be a parallel pencil of light by the collimator lens 3, and after being regulated by a slit, which is not shown in the drawings, it enters onto the polygonal mirror 4; then, the reflected laser beam by the polygonal mirror 4 passes the fθ lens 5, and enters into the second cylindrical lens 6. Further, the laser beam having passed the second cylindrical lens 6 reaches the surface to be scanned through the slit 41.

In the above, because the polygonal mirror 4 is rotating, the beam spot on the surface to be scanned moves to the direction of main scanning, and an exposure process in accordance with the modulation in the laser light source 2 is carried out. Further, because the surface to be scanned is moving in the direction of sub-scanning, the surface to be scanned is exposed to the laser beam two-dimensionally. The exposure start timing on every scanning line is determined on the basis of the photo-sensor 8.

In this example of the embodiment, a mechanism for adjusting and determining the position of the second cylindrical lens 6 is provided. The reason for it is that the second cylindrical lens 6 is positioned close to the surface to be scanned, and is easy to produce bending because it is a long-sized lens. According to this example of the embodiment wherein the mounting position of the second cylindrical lens 6 is adjusted, the scanning beam is corrected easily and in a good efficiency. In addition, because the second cylindrical lens 6 is in contact with the contact members 37 to 39 at three points, that is, the both end portions in the main scanning direction and the intermediate portion between these both end points respectively at the time of adjusting and determining the position of the second cylindrical lens 6, it is possible to let the second cylindrical lens 6 take any position by displacing the contact points.

Further, after adjusting and determining the position of the second cylindrical lens 6, it is fixed to the base 1 in order to prevent the positional deviation of the second cylindrical lens 6; this fixing is done, in this example of the embodiment, in the neighborhood of the contact point at the intermediate portion of the second cylindrical lens 6. Owing to this, the second cylindrical lens 6 is fixed only at the intermediate portion, it can freely expand and contract in accordance with the surrounding temperature and humidity, it is never bent unnaturally, and it can be avoided the unfavorable influence that a complex bending etc are produced in the scan lines.

The operation of adjusting and determining the position of the second cylindrical lens 6 in the above-described example of the invention will now be explained in more detail. In addition, here, the explanation will be given on the condition that there is no tilt angle error for each of the reflecting surfaces of the polygonal mirror 4.

The operation of adjusting and determining the position is carried out for the scanning optical devices in the state wherein the second cylindrical lens 6 is temporarily fixed. At this time, for the scan line detecting portion of the fixture for adjustment, it is used the one wherein three sensors are arranged on an ideal scan line which is assumed to be on the surface to be scanned. This sensor is the one capable of detecting to what degree an actual beam is deviated from the above-mentioned ideal scan line, and any method of detection can be used.

It can be known what kind of a curve an actual scan line is tracing from the output of the three sensors when a laser beam actually scans the surface. Therefore, in order that the curve as a whole may become closer to the ideal scan line, the amount of screwing for the screws for adjustment 37 to 39 is adjusted. The rotating operation of the screws for adjustment at this time is performed, for example, as follows:

(1) Parallel movement in the upward and downward direction (the direction of sub-scanning)

All the screws for adjustment 37 to 39 are rotated in the same direction.

(2) Tilting movement in the upward and downward direction (Rotation around an axis parallel to the main scanning direction)

The screws for adjustment 37 and 38 are rotated in the same direction, or the screw for adjustment 39 is rotated.

(3) Tilting movement in the left and right direction (Rotation around an axis perpendicular to the surface to be scanned)

The screw for adjustment 37 or 38 is rotated.

(4) Correction (for example, correction for bending)

This is possible in the case where the second cylindrical lens 6 is capable of bending like a plastic lens; the screws for adjustment 37 to 39 are independently rotated.

In addition, this invention concerning a scanning optical device is not limited to the above-mentioned example of the embodiment. For example, it is possible for the scanning optical device to have a structure as follows:

(A) The contact member is not limited to a screw for adjustment, and the number of the contact members is not limited to three. If the number of the contact members is increased, generally speaking, the range of adjustment such as correction is broadened, and also the precision of adjustment is improved.

(B) It is not required that all of the contact members are capable of moving in the upward and downward direction. For example, in a structure wherein the screws for adjustment 36 and 37 in the above-mentioned example of the embodiment is not capable of moving, the projections 19 and 20 are used as the contact members at this portion and the screws for adjustment 36 and 37 are not provided.

(C) The urging means is not limited to a leaf spring, and the number is not limited to two. In a structure wherein an elastic member such as a rubber is pressed, it is possible that the whole upper surface of the second cylindrical lens 6 is pressed by the elastic member.

(D) If it is desired that play for the screws for adjustment 37 to 39 in the axial direction against the base 1 is eliminated, it may be appropriate to make a structure such that a coil spring or the like is disposed between the head portion of the screws 37 to 39 and the base 1, in order that the screws for adjustment 37 to 39 may be always urged to the downward direction.

(E) The fixing of the optical parts such as the second cylindrical lens 6 is not limited to adhesive bonding.

(F) Although the correction for the scan lines is done by only the second cylindrical lens 6 in the above-mentioned example of the embodiment, it is possible to provide a mechanism for adjusting and determining the position in both of the second cylindrical lens 6 and the fθ lens 5 respectively.

(G) It is also possible to carry out the adjustment and determination of the position of the second cylindrical lens 6 automatically. In this case, as a matter of course, the signal from the sensor on the surface to be scanned is fed back to the control portion, and the amount of screwing of the screws for adjustment 37 to 39 is adjusted by the control portion in order that actual scan lines may become closer to the ideal scan line.

(The Second Example of the Embodiment)

Figure 9:
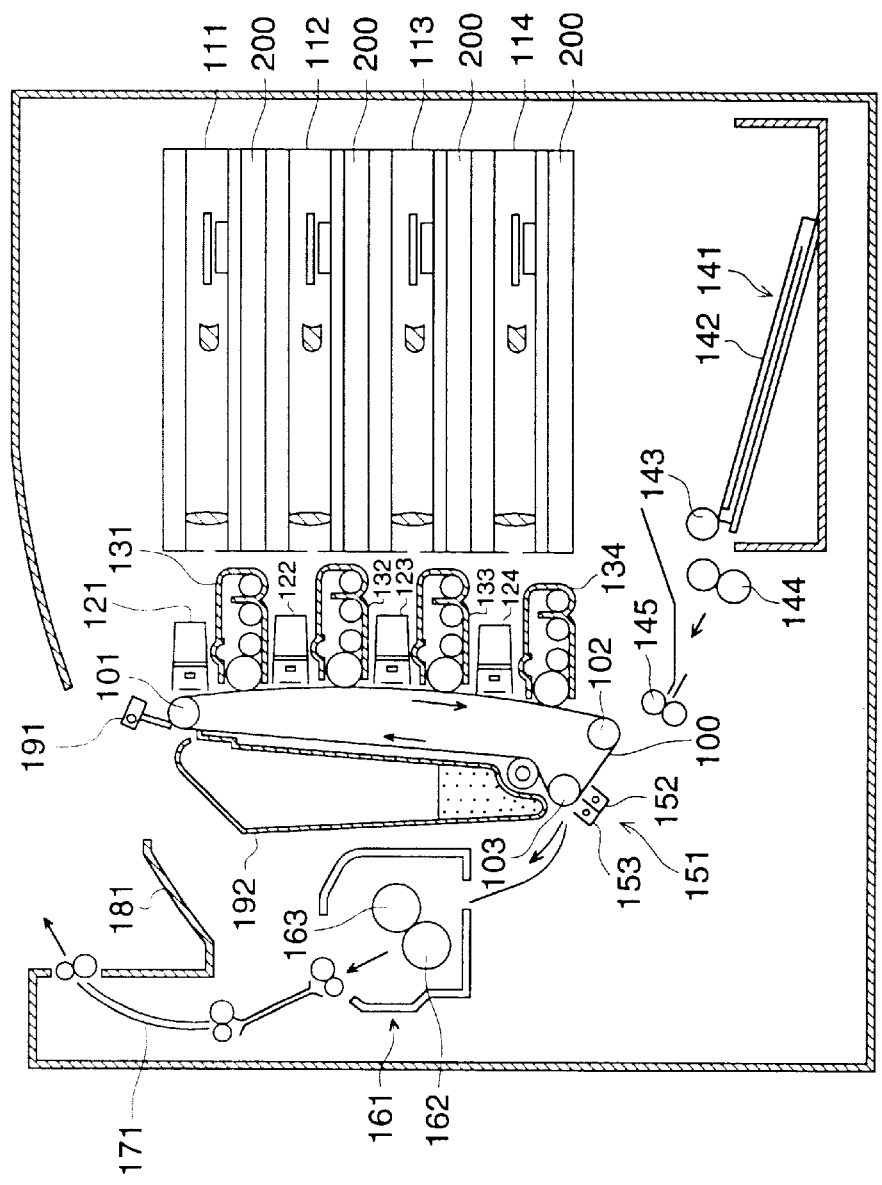
FIG. 9 is a drawing showing the structure of the scanning optical device in the linked state.

FIG. 9 is a drawing showing the structure of an example of the embodiment of this invention concerning an image forming apparatus. In an image forming apparatus in this example of the embodiment, formation of a color image using toners of four colors Y, M, C, and K with four scanning optical devices arranged in the direction of sub-scanning.

In FIG. 9, the belt-shaped image bearing member 100 is driven in the clockwise direction (direction of the arrow marks), being entrained around the rollers 101 to 109. In the neighborhood of the image bearing member 100, there are arranged the scanning optical devices 111 to 114 in the direction of sub-scanning in such a manner as to face toward the image bearing member 100. Each of the scanning optical devices 111 to 114 has the same structure as has been shown in the above-described first example of the embodiment, that is, the structure comprising at least a light source, a collimator lens into which a light beam having been emitted from said light source enters, a deflector which deflects the light beam having passed said collimator lens to the direction of main scanning, and an image forming lens which focuses the light beam having passed said deflector on the surface to be scanned of the image bearing member.

In the above, the scanning optical device 111 is one for forming a latent image for Y (yellow) by using a laser beam, the scanning optical device 112 is one for forming a latent image for M (magenta) by using a laser beam, the scanning optical device 113 is one for forming a latent image for C (cyan) by using a laser beam, and the scanning optical device 113 is one for forming a latent image for K (black) by using a laser beam.

Figure 10:
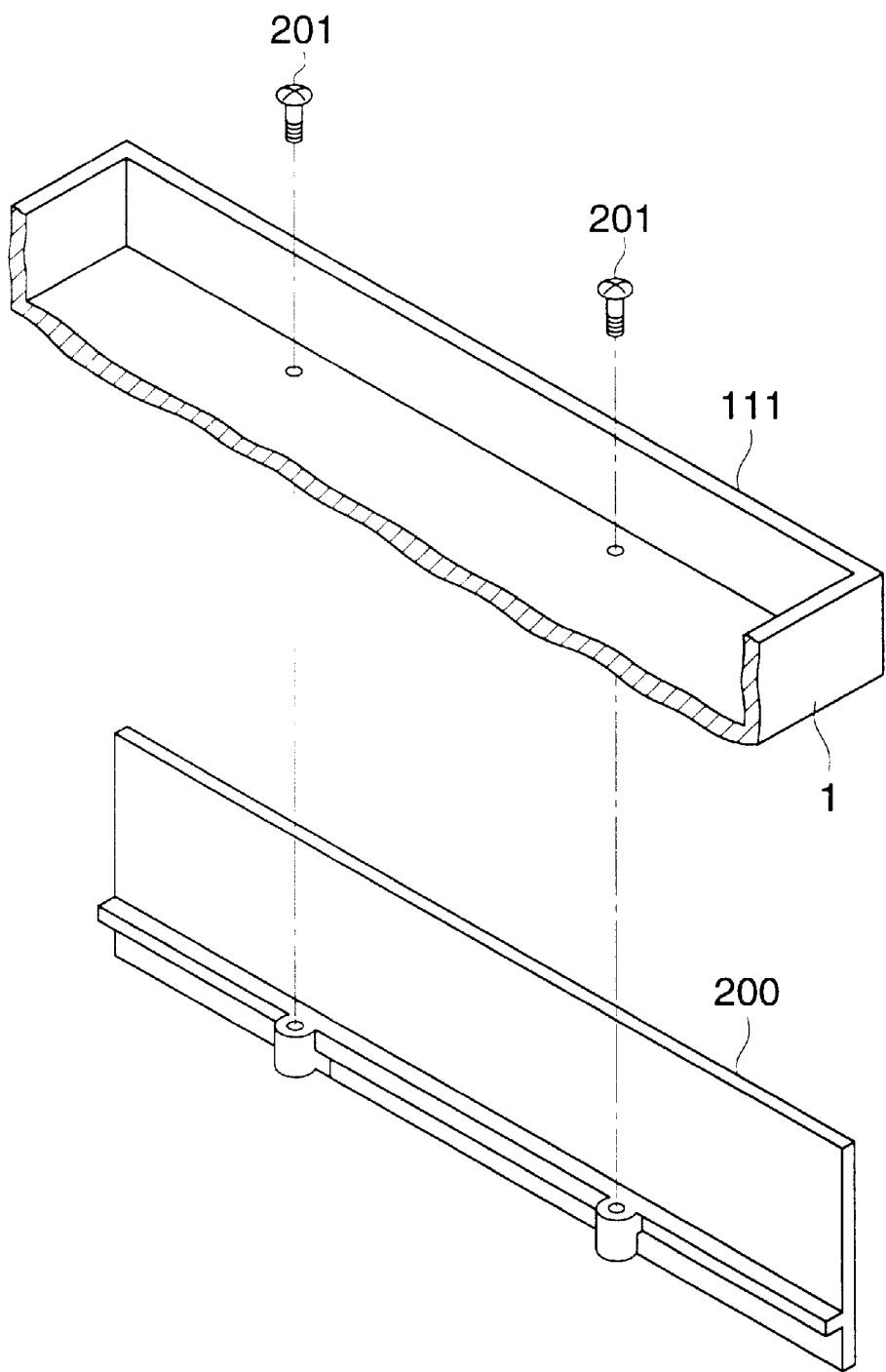
FIG. 10 is a perspective view showing the structure of fitting a link member.
Figure 11:
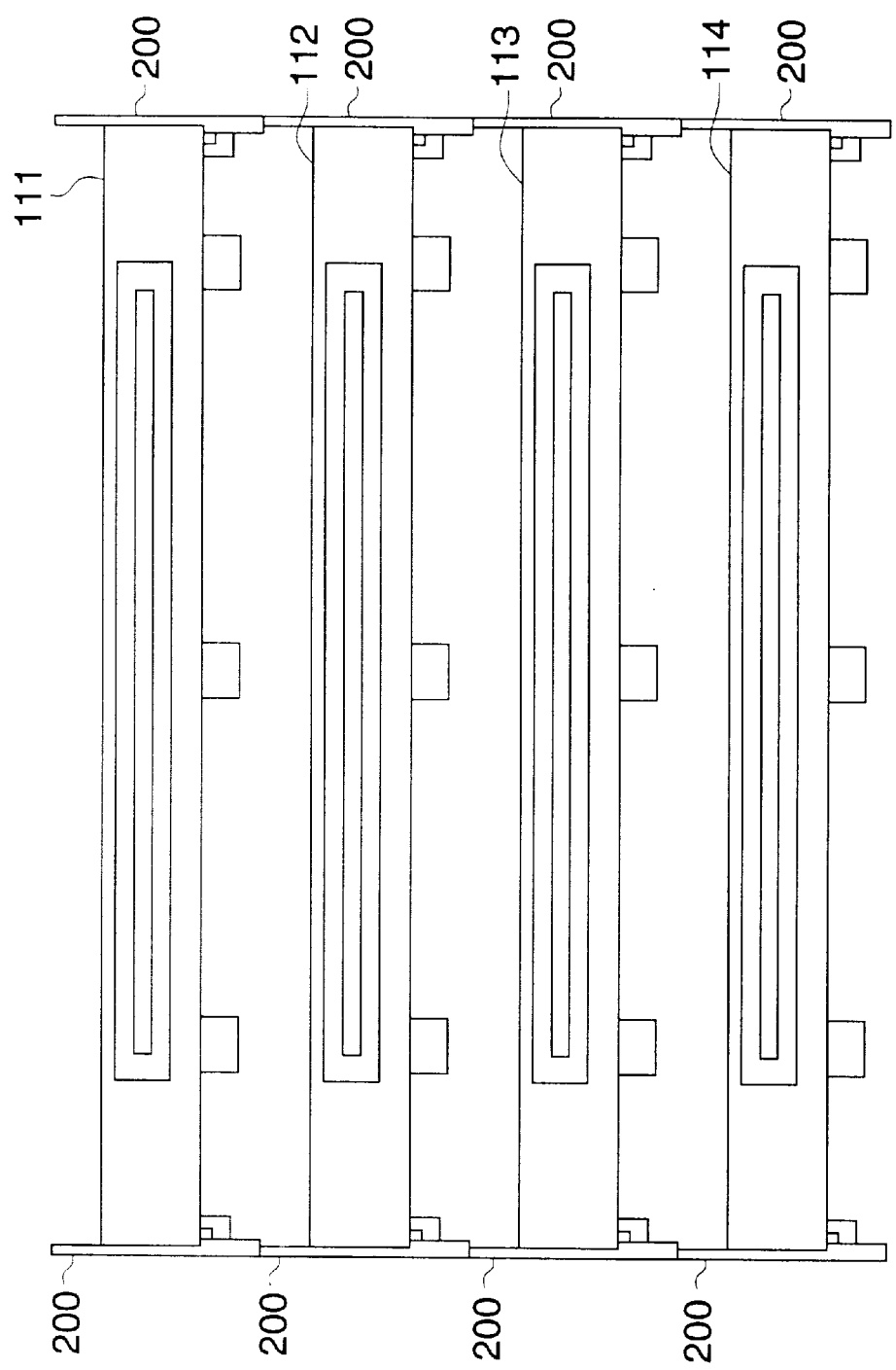
FIG. 11 is a drawing showing the structure of the scanning optical devices in the linked state.

Each of the scanning optical devices 111 to 114 is linked to the neighboring devices after determining the position. This linking is done by using a link member. To describe it concretely, as shown in FIG. 10, the link member 200 is fixed to the both side portions of the respective scanning optical devices 111 to 114 by using the plural screws 201 in a manner capable of being taken off, and after that, as shown in FIG. 11, the position of the one of the neighboring scanning optical devices is determined in the state of floating off against the other, and then the upper end surface and the lower end surface of the respective link members of the neighboring scanning optical devices are bonded to each other by using an adhesive of the UV-setting type or the like.

In this example of the embodiment, it is used the structure wherein the scanning optical devices 113 to 111 is successively stacked on the scanning optical device 114 one after another. In addition, although the link member 200 and the screws 201 is not necessary in the first example of the embodiment, they are shown in FIG. 1 to FIG. 3 for the purpose of making it easy to understand the structure of linking of the scanning optical devices in the second example of the embodiment.

In FIG. 9 again, at the respective front stages of the scanning optical devices 111, 112, 113, and 114, the charging portions 121, 122, 123, and 124, which give the image bearing member 100 electrostatic charges for Y, M, C, and K respectively, are provided; at the respective rear stages of the scanning optical devices 111, 112, 113, and 114, there are provided the developing units 131, 132, 133, and 134, which develop the latent images formed by the respective scanning optical devices 111, 112, 113, and 114 by using the developers for Y, M, C, and K respectively.

The transfer paper 142 in the paper feeding portion 141 is conveyed out by the paper feeding roller 143, and is fed to the transfer portion 151 by the transport roller pair 144 and the timing roller 145. This transfer portion 151 is composed of the transfer electrode 152 which transfers the toner image on the image bearing member 100 to the transfer paper 142 by corona discharging, and the pick off electrode 153 which picks off the transfer paper 142 from the image bearing member 100 by alternate current discharging.

The fixing portion 161 is composed of the heat roller 162 and the pressing roller 163, and fuses the toner image to stick to the transfer paper. The transfer paper 142 after this fixing process is ejected onto a receiving tray by the transport portion 171 at the rear stage of the fixing portion 161. Further, the residual toner particles remaining on the image bearing member 100 after transfer are scraped off in the cleaning portion 191, and are received in the collecting box 192.

In this example of the embodiment, the scanning optical devices 111 to 114 and the developing units 131 to 134, which are assigned to the colors Y, M, C, and K respectively, are arranged for every color in the direction of sub-scanning;

the scanning optical devices for the respective colors 111 to 114 are let to form the latent electrostatic images for the respective colors in a manner such that all the color toner images should be mutually superposed precisely, and the developing units 131 to 134 are let to develop the latent images respectively. That is, after forming the toner image of Y by using the scanning optical device 111 and the developing unit 131, the toner image of M is formed on the toner image of Y superposed by using the scanning optical device 112 and the developing unit 132, and the toner image of C is formed on them by using the scanning optical device 113 and the developing unit 133, and lastly the toner image of K is formed superposed on them by using the scanning optical device 114 and the developing unit 134; these steps complete the formation of color toner image, which is transferred to the transfer paper 142 at the transfer portion 151.

In the case where independent scanning optical devices are used for the respective colors as described in the above, it is necessary that each of the scanning optical devices forms a latent image in a manner such that it is precisely superposed on the others. In other words, it is necessary to let the respective scanning optical devices 111 to 114 trace scan lines of the same characteristic (the first condition), and also it is necessary to determine the positions of the respective scanning optical devices 111 to 114 in order that the scan lines traced by the respective scanning optical devices are superposed on one another (the second condition).

In this example of the embodiment, as for the scanning optical devices 111 to 114, the scanning optical device shown in FIG. 1 to FIG. 3 (the first example of the embodiment) is employed; therefore, it is easy to adjust each of the scanning optical devices 111 to 114 in order that they may trace scan lines having the same characteristic, and the first condition can be satisfied. Especially, if the optical parts for the second cylindrical lens etc designed to be of the same shape and material and obtained from the same manufacturing lot are used, the characteristics of the optical parts as the individual ones are made to be the same; thus, because the only thing to do further is merely to adjust and determine the positions of the optical parts, it is easier to let each of the scanning optical devices 111 to 114 trace scan lines of the same characteristic.

On the other hand, in order to satisfy the second condition, in this example of the embodiment, for the scanning optical devices 111 to 114 of which the adjustment of the individual device has been completed and of which to the both side portions the link members 200 are fixed respectively by using the plural screws 201 for each in a manner capable of being taken off, the positions are determined with one of the neighboring scanning optical devices let to be in the state of floating off against the other, and the upper end surface and the lower end surface of the respective link members of the neighboring scanning optical devices are bonded to each other by using an adhesive of the UV-setting type or the like.

As for the fixture for adjustment, in this example, it is used a fixture that is equivalent to one made up of four fixtures stacked on one another with a predetermined spacing, each of them being used at the time of adjustment for the first example of the embodiment. That is, it is used a fixture wherein four parallel ideal scan lines corresponding to the colors Y, M, C, and K respectively are assumed to be on the surface to be scanned, and a plurality of sensors are disposed on each of the ideal scan lines. Each of the sensors can detect to what degree an actual beam is deviated from the above-mentioned ideal scan line.

The operation of adjustment is carried out as follows. First, a beam is generated in the scanning optical device 114, and the position of this is determined in order that the actual scan line by this beam is superposed on the ideal scan line for the color K (the scanning optical device 114 is attached to the fixture for adjustment).

Next, the scanning optical device 113 is supported in the state of floating off against the scanning optical device 114, and is let to generate a beam; the position is determined in order that the actual scan line of the beam may be superposed on the ideal scan line for the color C, and the upper end surface and the lower end surface of the respective link members 200 of the scanning optical devices 114 and 113 are bonded to each other by an adhesive of the UV-setting type.

Further, the scanning optical device 112 is supported in the state of floating off against the scanning optical device 113, and is let to generate a beam; the position is determined in order that the actual scan line of the beam may be superposed on the ideal scan line for the color M, and the upper end surface and the lower end surface of the respective link members 200 of the scanning optical devices 113 and 112 are bonded to each other by an adhesive of the UV-setting type.

Lastly, the scanning optical device 111 is supported in the state of floating off against the scanning optical device 112, and in the same way, the position is determined in order that the actual scan line of the beam may be superposed on the ideal scan line for the color Y, and the upper end surface and the lower end surface of the respective link members 200 of the scanning optical devices 112 and 111 are bonded to each other by an adhesive of the UV-setting type.

In this connection, as for the cause of the relative deviation of the positions between the neighboring scanning optical devices, the following will be cited:

(1) Deviation in the upward and downward direction with regard to the surface to be scanned (in the direction of sub-scanning)

The scan lines also deviate in the upward and downward direction.

(2) Deviation in the left and right direction with regard to the surface to be scanned (in the direction of main scanning)

The scan lines also deviate in the left and right direction.

(3) Deviation in the direction perpendicular to the surface to be scanned

The length of the scan line is increased or decreased (lateral magnification is varied).

(4) Tilt around a horizontal axis perpendicular to the surface to be scanned

The scan lines are tilted in the upward and downward direction.

(5) Rotation around an vertical axis parallel to the surface to be scanned

The pixel density (interval between the neighboring pixels) on the scan lines is made large at one end portion and is made small at the other end portion.

The detection of the above-described (1) to (5) can be done by disposing three sensors on the ideal scan line. For example, if three sensors which detect respectively the position of the beam spot at the starting point, at the ending point, and at the center of the beam to be traced actually by the scanning optical device, the deviations (1) to (4) can be easily detected from the position of the beam spot at the starting point and the ending point, and the deviation (5) can be detected by judging to which side the beam spot at the center shifts, the starting point or the ending point.

In this example of the embodiment, because the scanning optical device to be determined for its position is supported in a state of floating off against the neighboring scanning optical device with an arm of an assembling robot or the like for carrying out the adjustment, the scanning optical device can be shifted in any direction. Therefore, the above-described deviations of the position can be easily reduced on the basis of the outputs of the plural sensors. Further, it is determined how high the precision of the adjustment and determination of the position by to what degree the image quality is required for the image forming apparatus.

By an experiment of the inventors, it has been confirmed that if the deviation of the latent images for the colors Y, M, C, and K formed on the surface to be scanned is not larger than 200 µm, or desirably not larger than 120 µm, the image can be recognized as an image giving no feeling of disorder.

It is possible to carry out the above-described linking of the scanning optical devices in the state of being loaded in the image forming apparatus, however actually, it makes the operation far more simple to link the plural scanning optical devices beforehand and then load the image forming apparatus with the scanning optical devices in the linked state.

As is obvious from the foregoing explanation, in this example of the embodiment, the positions of the plural scanning optical devices 111 to 114 to be arranged in the direction of sub-scanning are adjusted and determined with the devices made to be in the state of floating, and the link members are mutually linked after the determination of the positions. Owing to this, by once precisely adjusting and determining the positions of the scanning optical devices 111 to 114, the positional relationship among the scanning optical devices 111 to 114 will never be varied after that, and the deterioration of image quality owing to the scanning optical devices 111 to 114 can be prevented.

Further, because the link members 200 are fixed to the scanning optical devices 111 to 114 in a manner capable of being taken off, in the case where the determination of the positions is proved to be not satisfactory after the linking of the neighboring scanning optical devices, it is possible that the link members 200 are taken off from the scanning optical devices 111 to 114, with the state of mutual linking of the link members 200 let to remain as it is, and then, new link members 200 are attached to the scanning optical devices 111 to 114, and the positions are determined again, and the new link members 200 are fixed to one another. Owing to this, it has become possible to utilize again the scanning optical devices 111 to 114.

Furthermore, because an adhesive of the UV-setting type is used for fixing the link members 200 to one another, it is possible that the determination of the positions is carried out with a suitable amount of the adhesive injected between the link members, and the fixing is performed immediately after determining the positions by applying an ultra-violet ray; hence, the inking operation is made easy.

Besides, the above-described method of linking of the scanning optical devices 111 to 114 is one wherein the scanning optical devices 111 to 114 are successively linked one by one; however, it is possible to bond these devices at the same time after the positions of all the scanning optical devices 111 to 114 are determined. Further, in the above-described example of the embodiment, the link members 200 are fixed to one another by an adhesive of the UV-setting type; however, as a matter of course, it is possible to use other types of adhesive, and also it is possible to screw the link members or to weld them. Furthermore, because the deviation of the latent images for the colors Y, M, C, and K can be detected by utilizing the technology of what is called pattern recognition, it may be appropriate to detect the deviation of the positions by this method.

In some cases, keeping the superposition of the scan lines sure can be performed not only by the hardware-like method of adjusting and determining the positional relationship among the scanning optical devices 111 to 114, but also by a software-like adjustment method to devise how to drive the scanning optical devices. However, because it increases the burden on the software, it is desirable to make adjustment by a hardware-like method as far as possible.

As has been explained in the foregoing, in this invention concerning a scanning optical device, it is provided a mechanism for adjusting and determining the position of the image forming lens comprising contact members capable of being in contact with the image forming lens respectively at the three points, that is, the both end portions of the image forming lens in the main scanning direction and an intermediate portion between these both end portions and an urging means for urging the image forming lens to the contact members. The image forming lens is positioned in the vicinity of the surface to be scanned, and is easy to be subjected to bending owing to its long size. In spite of this, according to this invention for adjusting the position of fixing this image forming lens, the scanning beam is corrected easily and with a good efficiency. In addition to it, because the image forming lens is in contact with the contact members at the three points, namely, the both end portions in the main scanning direction and an intermediate portion between the both end portions respectively at the time of adjusting the position of the image forming lens, it is possible to let the image forming lens take any position by displacing the points of contact.

In the above-described invention, the points of contact of the image forming lens at its both end portions in the main scanning direction with the contact member are positioned on a straight line which is approximately parallel to the main scanning direction, and the point of contact at the intermediate portion is placed at a position deviated from a position on the above-mentioned straight line in the direction perpendicular to the surface to be scanned. Owing to this, the adjustment of position of the image forming lens can be performed by moving at least one of the contact members placed at the above-mentioned three points of contact in the direction of sub-scanning.

It is desirable that the image forming lens is fixed to the base in order to prevent the deviation of the position of the image forming lens after the adjustment of the position of the image forming lens. In the above-described invention, this fixing is made at a position in the neighborhood of the point of contact at the intermediate portion of the image forming lens. Owing to this, the image forming lens is fixed only at the intermediate portion, which makes it possible for the image forming lens to expand and contract freely in accordance with the variation of temperature and humidity of the surrounding; thus the image forming lens is never bent unnaturally and it can be avoided the unfavorable influence that a complex bending etc are produced in the scan lines.

According to this invention concerning an image forming apparatus, the positions of a plurality of scanning optical devices arranged in the direction of sub-scanning are adjusted and determined in the state of floating off against the others, and the linking members are mutually linked after determining the positions. Owing to this, by once precisely adjusting and determining the positions of the scanning optical devices, the positional relationship among the scanning optical devices will never be varied after that, and the deterioration of image quality owing to the scanning optical devices can be prevented.

Further, because the linking members are fixed to the respective scanning optical devices in a manner capable of being taken off, in the case where the determination of the positions is proved to be not satisfactory after the linking of the neighboring scanning optical devices, it is possible that these link members are taken off from the scanning optical devices, with the state of mutual linking of the link members let to remain as it is, and then new link members are attached to the scanning optical devices, and the positions are determined again, and the new link members are fixed to one another. Owing to this, it has become possible to utilize again the scanning optical devices.

In this invention concerning an image forming apparatus, as a scanning optical device, the above-described one is used, and at the same time, the mutual linking of the neighboring optical devices is made in the same manner as described in the above-described invention. Owing to this, according to this invention, in the respective scanning optical devices, the scanning beam can be corrected easily and with a good efficiency. Further, because the linking members are mutually linked after determining the positions, the positional relationship among the scanning optical devices is never varied, and the deterioration of image quality owing to the scanning optical device can be prevented. Furthermore, reutilization of the scanning optical devices has become possible.

Because an adhesive of the UV-setting type is used for fixing the above-described link members to one another, fixing can be made immediately after determining the positions, and the linking operation is made easy.

What is claimed is:

1. A scanning optical device to scan an image forming surface in a main scanning direction with a light beam, comprising:
   a light source which emits a light beam;
   a deflector which deflects the light beam in the main scanning direction;
   a bar-shaped cylindrical lens provided between the deflector and the image forming surface which focuses the deflected light beam on the image forming surface, and the bar-shaped cylindrical lens having a length along the main scanning direction which enables the light beam to form a line image on the image forming surface;
   an attitude adjuster which supports the bar-shaped cylindrical lens and adjusts an attitude of the bar-shaped cylindrical lens, the attitude adjuster comprising:
      first, second and third adjusters provided to the bar-shaped cylindrical lens in such an arrangement that the first and second adjusters are located at both end portions of the bar-shaped cylindrical lens respectively and the third adjuster is located at a middle portion of the bar-shaped cylindrical lens, and
      a pressing member which presses the bar-shaped cylindrical lens toward the first, second and third adjusters so that each of the first, second and third adjusters shifts a point of the cylindrical lens corresponding to the location thereof independent of other adjusters against the pressing force of the pressing member,
      wherein the shifting point of the third adjuster is distant from an imaginary line connecting the shifting points of the first and second adjusters so that the third adjuster rotates the bar-shaped cylindrical lens around the imaginary line so as to correct a tilt of the bar-shaped cylindrical lens.

2. The scanning optical device of claim 1, wherein the bar-shaped cylindrical lens is a curved bar-shaped cylindrical lens.

3. The scanning optical device as defined by claim 2, wherein a top plan view of the cylindrical surface is shaped in a circular arc.

4. The scanning optical device of claim 1, wherein the pressing member has first and second holding members between which the bar-shaped cylindrical lens is held with the pressing force.

5. The scanning optical device as defined by claim 4, wherein each of the first, second and third adjusters comprises an adjusting screw which passes through one of the first holding member and the second holding member and comes in contact with the first surface of the cylindrical lens.

6. The scanning optical device as defined by claim 4, wherein one of the first holding member and the second holding member comprises a base plate on which the deflector and the cylindrical lens are mounted and the other of the first holding member and the second holding member comprises a spring plate.

7. A scanning optical system for use in a color image forming apparatus, comprising:
   first and second scanning optical devices, each of the first and second scanning optical devices scans an image forming surface in a main scanning direction with a light beam so as to form a line image, each of the first and second optical devices comprising:
      a light source which emits a light beam;
      a deflector which deflects the light beam in the main scanning direction;
      a bar-shaped cylindrical lens provided between the deflector and the image forming surface which focuses the deflected light beam on the image forming surface, the bar-shaped cylindrical lens having a length along the main scanning direction which enables the light beam to form a line image on the image forming surface;
      an attitude adjuster which supports the bar-shaped cylindrical lens and adjusts an attitude of the bar-shaped cylindrical lens, the attitude adjuster comprising:
      first, second and third adjusters provided to the bar-shaped cylindrical lens in such an arrangement that the first and second adjusters are located at both end portions of the bar-shaped cylindrical lens respectively and the third adjuster is located at a middle portion of the bar-shaped cylindrical lens, and
      a pressing member to press the bar-shaped cylindrical lens toward the first, second and third adjusters so that each of the first, second and third adjusters shifts a point of the cylindrical lens corresponding to the location thereof independent of other adjusters against the pressing force of the pressing member,
   wherein the shifting point of the third adjuster is distant with respect to an imaginary line connecting the shifting points of the first and second adjusters so that the third adjuster rotates the bar-shaped cylindrical lens around the imaginary line so as to correct a tilt of the bar-shaped cylindrical lens, and
   wherein the third adjuster of the second scanning optical device rotates the bar-shaped cylindrical lens of the second scanning optical device so as to form the same line image as the line image formed by the first scanning optical device.

8. The scanning optical system as defined by claim 7, wherein each of the first and second scanning optical devices has a top surface and a bottom surface and the first and second scanning optical devices are vertically stacked such that the bottom connectable surface of a stacked scanning optical device comes in contact with the top connectable surface of a scanning optical system located beneath the stacked scanning device and the top connectable surface is shiftable in all directions to a desired position on the bottom connectable surface, the scanning optical system further comprising an adhesive to fix the top connectable surface with the bottom connectable surface at a desired position.

9. The scanning optical system of claim 7, wherein the bar-shaped cylindrical lens is a curved bar-shaped cylindrical lens.

10. The scanning optical system as defined by claim 9, wherein a top plan view of the cylindrical surface is shaped in a circular arc.

11. The scanning optical system as defined by claim 9, wherein the attitude adjuster of each of the first and second scanning optical devices adjusts the attitude of a corresponding bar-shaped cylindrical lens such that a shape of a line image formed along the main scanning direction on the image forming surface by one of the first and second scanning optical devices conforms with that of the other of the first and second scanning optical device.

12. The scanning optical system of claim 7, wherein the pressing member includes first and second holding members between which the bar-shaped cylindrical lens is held with the pressing force.

13. The scanning optical system as defined by claim 12, wherein each of the first, second and third adjusters comprises an adjusting screw which passes through one of the first holding member and the second holding member and comes in contact with a first surface of the bar-shaped cylindrical lens.

14. The scanning optical system as defined by claim 12, wherein one of the first holding member and the second holding member comprises a base plate on which the deflector and the bar-shaped cylindrical lens are mounted and the other of the first holding member and the second holding member comprises a spring plate.

* * * * *